United States Patent
Scholz (10) Patent No.: US 12,460,164 B2
(45) Date of Patent: Nov. 4, 2025

(54) PROCESS FOR PRODUCING A METHANE-ENRICHED GAS

(71) Applicant: HITACHI ZOSEN INOVA SCHMACK GMBH, Schwandorf (DE)

(72) Inventor: Matthias Scholz, Pettendorf (DE)

(73) Assignee: HITACHI ZOSEN INOVA SCHMACK GMBH, Schwandorf (DE)

( * ) Notice: Subject to any disclaimer, the term of this patent is extended or adjusted under 35 U.S.C. 154(b) by 459 days.

(21) Appl. No.: 17/995,970

(22) PCT Filed: Apr. 23, 2021

(86) PCT No.: PCT/EP2021/060641
§ 371 (c)(1),
(2) Date: Oct. 11, 2022

(87) PCT Pub. No.: WO2022/053184
PCT Pub. Date: Mar. 17, 2022

(65) Prior Publication Data
US 2023/0193176 A1 Jun. 22, 2023

(30) Foreign Application Priority Data
Sep. 9, 2020 (EP) .................................... 20195201

(51) Int. Cl.
*C12M 1/107* (2006.01)
*C12M 1/00* (2006.01)
(Continued)

(52) U.S. Cl.
CPC ............ *C12M 21/04* (2013.01); *C12M 29/00* (2013.01); *C12M 41/48* (2013.01); *C12P 5/023* (2013.01)

(58) Field of Classification Search
CPC ...... C12M 41/48; C12M 29/00; C12M 21/04; C12P 5/023; Y02P 20/133; Y02E 50/30
See application file for complete search history.

(56) References Cited

U.S. PATENT DOCUMENTS 11,807,530 B2* 11/2023 Foody ........................ C01B 3/34
11,946,001 B2* 4/2024 Foody .................. B01D 53/229
(Continued)

FOREIGN PATENT DOCUMENTS

DE   102012105658 A1   1/2014
DE   102012112889 A1   6/2014
(Continued)

*Primary Examiner* — Shogo Sasaki
(74) *Attorney, Agent, or Firm* — WELSH FLAXMAN & GITLER LLC (57) ABSTRACT

A process for the production of a methane-enriched gas including the steps of providing a bioreactor having at least one device for supplying a gas, and at least one outlet for removing the methane-enriched gas generated in the bioreactor; providing a device for determining the proportion of carbon dioxide in the methane-enriched gas removed from the bioreactor; specifying a target value S for the proportion of carbon dioxide in the methane-enriched gas removed from the bioreactor; supplying carbon dioxide-containing gas to the bioreactor; supplying hydrogen-containing gas to the bioreactor; forming methane-enriched gas in the bioreactor; removing the methane-enriched gas formed in the bioreactor from the bioreactor; determining an actual value for the proportion of carbon dioxide in the methane-enriched gas removed from the bioreactor; comparing the target value S with the determined actual value; regulating the quantity of supplied carbon dioxide-containing gas and/or regulating the quantity of supplied hydrogen-containing gas in a manner such that the determined actual value corresponds to the specified target value S, wherein the target value S specified for the proportion of carbon dioxide in the methane-enriched gas removed from the bioreactor satisfies the condition 0 vol %<S≤5 vol %.

16 Claims, 7 Drawing Sheets

(51) Int. Cl.
    *C12M 1/36*     (2006.01)
    *C12P 5/02*     (2006.01)

(56) References Cited

U.S. PATENT DOCUMENTS

2021/0214287 A1*   7/2021   Kothandaraman .......................... C07C 29/1512
2021/0317375 A1*  10/2021   Greager ................. C10K 1/002

FOREIGN PATENT DOCUMENTS

| | | |
|---|---|---|
| DE | 102014111287 A1 | 2/2016 |
| DE | 102014111298 A1 | 2/2016 |
| EP | 2982740 A1 | 2/2016 |
| WO | 200894282 A1 | 8/2008 |
| WO | 2012110257 A1 | 8/2012 |
| WO | 2020152017 A1 | 7/2020 |

* cited by examiner

PROCESS FOR PRODUCING A METHANE-ENRICHED GAS

TECHNICAL FIELD

The invention relates to a process for the production of a methane-enriched gas.

PRIOR ART

In the context of the change in energy policy, the proportion of energy production taken up by renewable resources is more and more increasing. Because renewable forms of energy such as power from wind or photovoltaics are not uniformly available from either a temporal or a quantitative standpoint, and also demand from consumers fluctuates with time, storage possibilities for renewable energies are becoming increasingly important. In this regard, methane is of fundamental importance as a chemical energy carrier with multiple potential applications in the areas of heat production, fuels or power production.

Particularly in energy conversion systems which, according to the "power to gas" principle, convert surplus power into gaseous chemical energy carriers, methane appears to be a suitable energy carrier because, in contrast to hydrogen, it constitutes a form of energy which is readily stored in existing infrastructures using the natural gas grid as well as the already existing network of natural gas filling stations. In this regard, methane is produced from carbon dioxide and hydrogen as starting materials. As a rule, in these systems, the hydrogen is provided by the electrolysis of water with the aid of an electrolyser, wherein surplus power or other cheap power is used. The carbon dioxide which is required for the methane production may derive from various sources such as waste industrial or combustion gases, but preferably, climate-friendly $CO_2$ from renewable sources such as biomass is used, such as that which arises from biogas plants or also as digester gas in sewage treatment plants.

Compared with chemically catalysed methanation, for example using the Sabatier process, processes for biological methanation, in which the biomethane is formed by methanogenic microorganisms, are carried out without expensive and sensitive catalysts and make fewer demands as regards reaction conditions such as temperature and pressure as well as the purity of the starting gases $CO_2$ and $H_2$.

As an example, WO 2008/094282 A1 describes a biological system for the production of methane from hydrogen and carbon dioxide using a microorganism culture in a culture medium. In this regard, the carbon dioxide derives from an industrial process, while the hydrogen is obtained, inter alia, by electrolysis using cheap surplus power.

A system for storing electrical energy in the form of methane is known from WO 2012/110257 A1, in which power from renewable and non-renewable energy sources is used for hydrogen production. The hydrogen is introduced together with carbon dioxide into a reactor which contains cultures of methanogenic microorganisms in a culture medium which then produce methane. In this regard, the ratio of the partial pressures of the gaseous hydrogen to carbon dioxide in the reaction vessel during the cell growth phase is set to a value which is less than or equal to 4:1 and to a value of 5:1 or higher in the methane formation phase.

DE 10 2012 112 889 A1 discloses an energy conversion system with an electrolysis unit for the electrochemical production of hydrogen and oxygen from water and an anaerobic bioreactor. The energy conversion system comprises a controlling and regulating unit for controlling and regulating both the supply of hydrogen to the bioreactor as well as the removal of the methane-containing product gas from the bioreactor. The controlling and regulating unit uses the $CO_2$ content of the methane-containing biogas as the primary control variable, which has to be regulated to a value of zero. As long as carbon dioxide is present in the methane-containing biogas, there is a positive feedback to the inflow of hydrogen into the anaerobic bioreactor. If $CO_2$ is no longer present in the biogas, the hydrogen supply to the anaerobic bioreactor is restricted and the hydrogen produced with the electrolyser is temporarily stored.

EP 2 982 740 A1 discloses a process for the production of methane from a carbon dioxide-containing biogas and hydrogen in a bioreactor. A device for controlling and regulating controls and regulates both the inflows and outflows of methanization medium as well as the gas inflows and outflows in and out of the bioreactor, in particular also the ratio of the gas flows of added hydrogen to the added $CO_2$-containing gas. As a rule, $H_2$ is used in a ratio of 4:1 to $CO_2$, however fine-tuning is carried out as a function of the composition of the starting gas from the bioreactor. In order to obtain a biomethane content as high as possible, neither too much hydrogen nor too much $CO_2$ must be measurable in the product gas from the bioreactor. Fine-tuning is carried out appropriately, during which the ratio of added $H_2$ to $CO_2$ can deviate somewhat upwards or downwards from the ratio of 4:1.

In the vast majority of processes described in the prior art, biological methanation is carried out with a ratio of the educt gases $H_2$ to $CO_2$ of 4:1 so that, according to the reaction equation for the methanation reaction:

$$4H_2 + CO_2 \rightarrow CH_4 + 2H_2O,$$

there is no excess educt gas.

The aim of any technical process for the production of a methane-enriched gas is to obtain a methane content as high as possible in the product gas and to minimize the proportions of the unreacted educt gases hydrogen and carbon dioxide. In particular, when feeding the methane-enriched gas into a public gas distribution system, as a rule, maximum infeed limits are prescribed for gas components such as hydrogen and carbon dioxide which, compared with methane, can only be present in small proportions of a few percent (in Germany, for example, this is specified in the DVGW [German Technical and Scientific Association for Gas and Water] guidelines, technical rules G 260 and G 262). In this regard, the supply limit for hydrogen is lower than that for carbon dioxide.

Because as a rule, hydrogen has to be produced by electrolysis while carbon dioxide is often obtained as a residual gas from other sources such as digester gas or crude biogas, hydrogen constitutes the more expensive educt gas.

Thus, both as regards the infeed capability of the methane-enriched gas into a public gas distribution system as well as having regard to economic optimization of the process, the hydrogen content of the product gas constitutes the critical value. For these reasons, when controlling the methanation process on the basis of the product gas composition, it is the hydrogen content of the product gas which is at the forefront and not its carbon dioxide content.

Despite of the strategies described above, processes for biological methanation are still sought by means of which a methane-containing gas can be produced with a good product gas quality in a more efficient and more economic manner by using hydrogen and $CO_2$.

DISCLOSURE OF THE INVENTION

The problem underlying the present invention is to provide an efficient and economical process for biological methanation which is suitable for the production of a methane-containing gas with a good product gas quality, using $CO_2$ and hydrogen in a stable process.

In accordance with the invention, this problem is solved by means of the process for the production of a methane-enriched gas according to claim 1. Further advantageous details, aspects and embodiments of the present invention are defined in the dependent claims, the description and the figures.

The present invention provides a process for the production of a methane-enriched gas, comprising the steps of:
a) providing a bioreactor having:
   at least one device for supplying a gas,
   at least one outlet for removing the methane-enriched gas generated in the bioreactor,
b) providing a device for determining the proportion of carbon dioxide in the methane-enriched gas removed from the bioreactor,
c) specifying a target value S for the proportion of carbon dioxide in the methane-enriched gas removed from the bioreactor,
d) supplying carbon dioxide-containing gas to the bioreactor,
e) supplying hydrogen-containing gas to the bioreactor,
f) forming methane-enriched gas in the bioreactor,
g) removing the methane-enriched gas formed in the bioreactor from the bioreactor,
h) determining an actual value for the proportion of carbon dioxide in the methane-enriched gas removed from the bioreactor,
i) comparing the target value S specified in step c) with the actual value determined in step h),
j) regulating the quantity of carbon dioxide-containing gas supplied in step d) and/or regulating the quantity of hydrogen-containing gas supplied in step e) in a manner such that the actual value determined in step h) corresponds to the target value S specified in step c),
wherein the target value S specified in step c) for the proportion of carbon dioxide in the methane-enriched gas removed from the bioreactor satisfies the condition $0 \text{ vol }\% < S \leq 5 \text{ vol }\%$.

The process in accordance with the invention is carried out with the aid of a bioreactor for the production of a methane-enriched gas by means of biological methanation. A variety of reactor types may be used as bioreactor, such as, for example, a continuous stirred tank reactor, a column reactor, a tube reactor, a bubble column, a trickle bed reactor or a reactor cascade. The bioreactor should be produced from a material which can withstand pressure and heat, for example stainless steel. Compared with the anaerobic fermenters of a biogas plant or a digestion tower of a sewage treatment plant, the reactor volume of the bioreactor for biological methanation is significantly smaller, for example in the range of 1/10 to 1/1000 of the volume of a fermenter of a biogas plant or a digestion tower of a sewage treatment plant.

The bioreactor is supplied with a carbon dioxide-containing gas as well as with an externally produced hydrogen-containing gas. The hydrogen required for the biological methanation is preferably produced by means of an electrolyser. Preferably, the hydrogen is produced in the electrolyser using surplus power from the power grid by the electrolysis of water. The provision of surplus power is usually overseen by a Regelenergiebox so that the plant for biological methanation can participate in the power balancing market with the level of power as the corresponding electrolyser. Even if the electrolyser does not participate in the power balancing market, cheap power from other sources (for example from special power tariffs) could be used. Alternatively, hydrogen from other sources such as hydrolysis gas, synthesis gas, product gas from chemical reactions, $H_2$ of biological origin such as $H_2$ produced by algae or $H_2$ from photocatalysis, for example, may be used for the biological methanation.

The bioreactor contains an aqueous reaction medium which serves as a substrate or nutrient medium for the methanogenic microorganisms and therefore acts as a methanation medium. Either a synthetic culture medium for methanogenic microorganisms as described in the prior art (for example WO 2008/094282 A1, EP 2 982 740 A1) or a complex nutrient medium based on biomass which substantially consists of a fermentation residue as the substrate and which may optionally be supplemented with nutrients and/or trace elements (for example EP 2 982 740 A1), is used as the methanation medium in which the methanation reaction takes place. The fermentation residue from a biogas plant, in particular the fermentation residue from a later fermentation stage or from a secondary fermenter, may be used as the substrate, wherein the fermentation residue may also originate from a repository. In addition, in principle, any type of raw sludge and/or digested sludge from a sewage treatment plant may be suitable as a substrate for the bioreactor for biological methanation.

Methanogenic microorganisms, in particular hydrogenotrophic methanogenic microorganisms, are added to a synthetic culture medium in the form of a pure culture or a mixed culture of suitable microorganisms. When a fermentation residue is used as the substrate, methanogenic microorganisms are already present as a rule, however optionally, additional hydrogenotrophic methanogenic microorganisms may be added. Thermophilic methanogens of the genus Methanothermobacter are particularly suitable.

The bioreactor for biological methanation advantageously has a suitable system for introducing gas into the liquid reactor medium, for the $CO_2$-containing gas as well as for the hydrogen-containing gas. The $CO_2$-containing gas as well as the hydrogen-containing gas are preferably introduced into the bioreactor via supply lines. Preferably, the two gases have already been mixed in a gas mixing chamber prior to introduction into the reactor and are then fed into the reactor via a common educt gas line. The supply of the $H_2$ and $CO_2$ containing educt gases is carried out either directly into the bioreactor via at least one supply line, preferably into the lower region of the bioreactor, or via a gas inlet into the substrate supply line for the bioreactor.

Agitators, in particular gasification agitators and cascade agitators (for example Ekato), dynamic mixers, multiphase pumps (for example an Edur pump) as well as column reactors have been shown to be particularly suitable systems for the introduction of gas. These gas introduction systems may be combined with systems integrated into the reactor for fine gas distribution, such as perforated plates, diffusors, sintered materials, or membranes. Technically, the gas introduction and distribution to function properly, the viscosity of the fermenter contents should not be too high.

The methane-enriched gas which is formed is discharged from the bioreactor via a product gas line which is preferably disposed at the upper end of the bioreactor. As a rule, prior to any further upgrading of the product gas, a gas treatment with the steps of gas drying and gas cooling as well as optional desulphurization, gas scrubbing in order to separate further components such as ammonia, for example, and/or $H_2$ separation are carried out. In this manner, a prepared SNG (Substitute Natural Gas) or bionatural gas or biomethane which can be fed into a public gas distribution system can be prepared from the methane-enriched gas leaving the bioreactor as the product gas. In addition to feeding SNG into the natural gas distribution system, it is possible to exploit it as fuel, for example in the form of a bionatural gas filling station or use as a material. A further possibility for utilisation is generation of electricity from biomethane with simultaneous heat production, for example via a co-generation plant, during times when the electricity supply is too low. In this case, temporary storage for the biomethane produced is required. This and also a co-generation plant are often already integrated into the corresponding plants and therefore can advantageously be used for the process in accordance with the invention.

In addition, the bioreactor is advantageously equipped with a pressure retaining valve and corresponding pressure-stable components, so that a reaction pressure which is higher than the atmospheric pressure, in particular an over-pressure of up to 30 bar, preferably an over-pressure of up to 16 bar, can be set. The bioreactor is optionally equipped with sensors for the measurement of temperature, pressure and pH. In addition, a system for regulating the pH or for adding base or acid may be provided.

In accordance with the invention, the controlled addition of the educt gases $H_2$ (or hydrogen-containing gas) and $CO_2$ (or $CO_2$-containing gas such as crude biogas or sewer gas) can be adjusted on the basis of the $CO_2$ content in the product gas. In this regard, firstly, a target value S is specified for the proportion of carbon dioxide in the methane-enriched gas removed from the bioreactor. In accordance with the invention, the adjustment of the quantity of added carbon dioxide-containing gas and/or the adjustment of the quantity of added hydrogen-containing gas is carried out in a manner such that the measured actual value of the proportion of $CO_2$ in the product gas is as close as possible or corresponds to the specified target value S. Preferably, in all of the gas flows from and to the bioreactor, both the gas composition as well as the gas flow (quantity of gas per unit time) is measured.

Thus, the $CO_2$ content in the product gas is adjusted to a specific value. As will be described below in more detail, this value for the $CO_2$ content in the product gas is preferably 1 vol %; particularly preferably, the value is in the range 0.1 vol % to 1.5 vol %. In contrast to the processes known from the prior art, the aim here is thus not to obtain a $CO_2$ content of zero in the product gas. During regulation the quantity of $H_2$ and/or the quantity of $CO_2$ in the educt gas flow is varied, and thus in each case the ratio of $H_2$ to $CO_2$ in the educt gas flow is varied in a manner such that the specified target value S is obtained. For the educt gas flow, as a rule, either a specific value for the volume flow of hydrogen-containing gas is specified and the volume flow for the $CO_2$-containing gas is varied, or the educt gas flow is supplied with a specified volume flow of $CO_2$-containing gas and the volume flow of hydrogen-containing gas is correspondingly varied.

The regulation of the $CO_2$ content in the product gas ensures that in the product gas, a stable, low $CO_2$ content on a scale of up to a few percent of $CO_2$ is present; this is important for good gas quality.

It has also been established that the $CO_2$ concentration in the product gas has a substantial influence on the pH in the bioreactor. In known manner, biological methanation operates in a pH range of about 6.5 to approximately 9.0 with a preferred pH range of between 7.0 and 8.0 and particularly preferably between a pH of 7.0 and 7.5. For this reason, in the process known from the prior art, a pH adjustment is often carried out by means of measuring the pH with a pH probe directly in the reactor and a corresponding subsequent addition of acid or base depending on the measured pH. The pH is thus adjusted to within the desired range by the direct addition of acid or base.

According to the process of the invention, the pH in the bioreactor is influenced by the $CO_2$ concentration in the product gas. In this regard, too small a proportion of $CO_2$ in the product gas leads to a rise in the pH in the bioreactor, while too high a proportion of $CO_2$ in the product gas leads to acidification of the reactor contents. The physical-chemical processes forming the basis of this are described in Henry's Law and in the Henderson-Hasselbalch equation. By regulating the $CO_2$ content in the product gas, then, the pH in the reaction medium is stabilized without having to carry out an external addition of acid or base. Despite this, the bioreactor should have a connection for a metering pump for the addition of base or acid. A metering pump of this type does not, however, act primarily for continuous pH adjustment, but acts to take countermeasures during incidents, to stabilize a methanation medium with a low buffering capacity, or the like.

The cited effects add to each other because the stabilization of the pH of the reaction medium in the bioreactor by means of the adjustment of the methanation process via the $CO_2$ content in the product gas leads to a stable process which in addition is accompanied by good gas quality, because the $CO_2$ content in the product gas is limited to a low value. Astonishingly, this means that pH adjustment with a pH probe in the bioreactor and associated controlled addition of acid or base can be omitted, whereupon a simpler and less expensive process is provided. A device for measuring the $CO_2$ content of the product gas as well as corresponding flow regulators for controlled addition of the educt gases $H_2$ and $CO_2$ are usually present in methanation plants and can therefore be employed to advantage.

In the known prior art processes, in which the ratio of $H_2$ to $CO_2$ is adjusted to a value of 4:1 (or to different specified values), the problem often arises that disturbances which have a negative effect on the biological methanation process (for example lack of nutrients, oxygen input, impurities, variation in the pH) can lead to a deterioration in the quality of the methanation gas, which results in an increase in the hydrogen content in the product gas because the hydrogen added as educt gas is no longer completely reacted. In the case of a ratio controller, the $CO_2$ content in the product gas would also increase with increasing $H_2$ content in the product gas, because with an increasing proportion of unreacted hydrogen, the proportion of unreacted carbon dioxide would also increase. This would result in a drop in the pH in the bioreactor and therefore to a further deterioration of the gas quality. In case of the regulation in accordance with the present invention using the carbon dioxide content in the product gas, the actual ratio of $H_2$ to $CO_2$ in the product gas is not taken into account, whereupon, as already described, a more stable pH is obtained because the $CO_2$ content in the product gas is adjusted independently of the $H_2$ content.

Thus, the $CO_2$ content of the product gas acts as the regulating variable in the process in accordance with the invention. This is preferably measured continuously and is used as feedback to the controller in vol % as the actual value. A specific value S for the proportion of carbon dioxide in the methane-enriched gas removed from the bioreactor is specified (vol %) as the reference variable or target value. In accordance with the invention, S must satisfy the condition 0 vol % < S ≤ 5 vol %.

As an alternative to the proportion by volume of the carbon dioxide, the molar proportion may also act as the regulating variable. When the proportion by weight of carbon dioxide is measured, this would have to be converted to the molar proportion with respect to the other components of the product gas.

Preferably, the target value S for the proportion of carbon dioxide in the methane-enriched gas removed from the bioreactor satisfies the condition 0 vol %<S≤4 vol %, particularly preferably the condition 0 vol %<S≤3 vol %, especially preferably 0 vol %<S≤2 vol % and more particularly preferably the condition 0 vol %<S≤ 1.5 vol %.

In accordance with further preferred embodiments of the present invention, the target value S for the proportion of carbon dioxide in the methane-enriched gas removed from the bioreactor satisfies the condition 0.1 vol %≤S≤5 vol %, preferably the condition 0.1 vol %≤S≤4 vol %, particularly preferably the condition 0.1 vol %≤S≤3 vol %, especially preferably the condition 0.1 vol %≤S≤2 vol %, and more particularly preferably the condition 0.1 vol %≤S≤1.5 vol %.

In accordance with further preferred embodiments of the present invention, the target value S for the proportion of carbon dioxide in the methane-enriched gas removed from the bioreactor satisfies the condition 0.2 vol %≤S≤5 vol %, preferably the condition 0.2 vol %≤S≤4 vol %, particularly preferably the condition 0.2 vol %≤S≤3 vol %, especially preferably the condition 0.2 vol %≤S≤2 vol %, and more particularly preferably the condition 0.2 vol %≤S≤1.5 vol %.

In accordance with further preferred embodiments of the present invention, the target value S for the proportion of carbon dioxide in the methane-enriched gas removed from the bioreactor satisfies the condition 0.5 vol %≤S≤5 vol %, preferably the condition 0.5 vol %≤S≤4 vol %, particularly preferably the condition 0.5 vol %≤S≤3 vol %, especially preferably the condition 0.5 vol %≤S≤2 vol %, and more particularly preferably the condition 0.5 vol %≤S≤1.5 vol %.

In accordance with a particularly preferred embodiment of the present invention, the target value S for the proportion of carbon dioxide in the methane-enriched gas removed from the bioreactor is about 1 vol %.

In order to carry out the regulation technically, the quality of the product gas after leaving the methanation reactor is determined. Devices for the measurement of the $CO_2$ content of the product gas (regulating variable) as well as the $CH_4$ content and the $H_2$ content of the product gas are usually already present in a methanation system and can thus be employed to advantage. Preferably, the device for product gas analysis is located directly adjacent to the methanation reactor or in the gas treatment region. In this manner, the actual value for the proportion of carbon dioxide in the methane-enriched gas removed from the bioreactor is measured continuously. Next, the control deviation between the target value and the actual value is calculated by forming the difference between the target value and the actual value.

Particularly preferably, the regulation of the quantity of added carbon dioxide-containing gas and/or the regulation of the quantity of added hydrogen-containing gas is carried out exclusively on the basis of the comparison of the specified target value S with the measured actual value for the proportion of carbon dioxide in the methane-enriched gas removed from the bioreactor. In this case, therefore, no further parameters, such as the gas composition of the product gas or the pressure, temperature, redox potential or pH in the bioreactor, are taken into consideration.

Under specific prevailing reaction conditions (for example pressure, temperature) in the bioreactor, the pH constitutes a suitable parameter for determining the respective value for the target value S and/or to regulate it during methanation. In principle, $CO_2$ contents in the product gas which are as low as possible (for example less than 2 vol %) are preferred because in this manner, a maximum methane content can be obtained in the product gas. On the other hand, very low $CO_2$ contents, of less than 0.5 vol %, for example, are comparatively difficult to measure and to control from a measurement and control engineering standpoint. The extent to which different specifications for the target value S influence the pH of the methanation medium in the bioreactor also depends on the nature of the substrate employed. On the one hand, the buffering capacity of the methanation medium influences the choice of target value. A synthetic culture medium with a low buffering capacity reacts differently to a high target value S than a methanation medium based on a fermentation residue with a complex composition. Methanation media which are adapted from fermentation residues or digested sludge may, for example, have a starting composition pH of 7.5 or higher. In this case, the specified target value S for the $CO_2$ content is a higher value, for example 1.5 vol % or higher, so that the higher $CO_2$ content counteracts a too high rise in pH.

In all cases, the controller determines in accordance with the specified control parameter, as a regulating variable, a specific ratio of Hz to $CO_2$ in the educt gas which acts on the control variable via the control system, i.e. the biological methanation in the methanation reactor. Depending on whether, during the methanation, the educt gas volume flow for $H_2$ (or $H_2$-containing gas) or $CO_2$ (or $CO_2$-containing gas) has to be kept constant, in order to regulate the regulating variable, the volume flow of Hz (or of Hz-containing gas) or of $CO_2$ (or of $CO_2$-containing gas) is varied. However, it is also possible to vary both educt gas flows simultaneously or one after the other.

Particularly preferably, the device for supplying a carbon dioxide-containing gas and/or the device for supplying a hydrogen-containing gas is a device for regulating flow. In order to be able to implement the respective current specification of the controller for the control variable, flow regulators are preferably employed which ensure a variable delivery of the volume flows of the educt gases $H_2$ and $CO_2$ into the methanation reactor.

In accordance with a preferred embodiment, the comparison of the specified target value S with the measured actual value as well as the regulation of the quantity of supplied carbon dioxide-containing gas and/or the regulation of the quantity of supplied hydrogen-containing gas is carried out by means of a processor unit. The "controller" is thus preferably an algorithm which is in the form of a software solution in a suitable environment (for example SPS, ibaLogic). This program must, however, be executed on suitable hardware which is in communication with the methanation plant. This may, for example, be a suitable computer which is used to control and regulate the plant. This does not necessarily have to be located on the methanation reactor, but may also be connected with it via lines or be controlled remotely.

The methanation reactor itself constitutes the control system. Any parameters which vary the composition of the product gas of the methanation can act as disturbances acting on the control system, i.e. for example variations in the pH or the temperature of the bioreactor, but also variations in the composition of the reactor medium due to the growth and metabolization of the microorganisms.

A distinct advantage of the process in accordance with the invention compared with other known processes of the prior art is that the economics are increased, because a lot of the infrastructure and technology which is already present can be used in order to increase the methane yield by means of the bioreactor for biological methanation. An additional advantage is that with the process in accordance with the invention, adjustment to a good product gas quality also generates a stable pH without having to add substantial quantities of base or acid. The regulation of the carbon dioxide content of the product gas thus also substantially carries out the regulation of the pH of the reactor contents.

Definitions

Biogas: The term "biogas" should be understood to mean a gas which is formed in an anaerobic fermentation in a plant for the production of biogas under the action of various microorganisms. It contains methane and carbon dioxide as the main components. In addition, it contains water vapour and possibly small proportions of hydrogen, nitrogen, oxygen, hydrogen sulphide and ammonia. This type of biogas is also termed crude biogas and can, for example, be supplied to a combined heat and power plant in order to produce power and heat. If the crude biogas is processed further in order, for example, to be subsequently fed into a natural gas distribution system, then carbon dioxide is separated out, inter alia. The separated carbon dioxide-rich gas from a biogas process can preferably be used as the carbon dioxide-containing educt gas for the biological methanation. However, crude biogas is also suitable as the carbon dioxide-containing educt gas for the biological methanation. A plant for the production of biogas can, for example, be a biogas plant in which the biogas is produced from biomass. Furthermore, the plant for the production of biogas may also be a sewage treatment plant which has a digestion tower. The biogas produced in a sewage treatment plant is also known as digester gas or sewer gas.

Educt gas: Educt gases for methanation are hydrogen-containing gas and carbon dioxide-containing gas or hydrogen and carbon dioxide.

Methane-enriched gas=product gas=biomethane: a "methane-enriched gas" should be understood to mean a gas which is formed by the action of hydrogenotrophic methanogenic microorganisms in an anaerobic bioreactor with the supply of hydrogen-containing and carbon dioxide-containing gas. The methane-enriched gas is also the product gas which is formed from the educt gases in the bioreactor in the biological methanation process and which leaves the bioreactor in the product gas line. In addition to $CH_4$, the methane-enriched gas can also contain proportions of the educt gases introduced into the bioreactor for methanation, for example unreacted hydrogen and carbon dioxide or other gases which are present in smaller quantities, such as nitrogen, hydrogen sulphide or ammonia, as they occur in a crude biogas, for example, so that the methane-enriched gas does not have to consist of 100% methane. However, methane is the main component of the methane-enriched gas. The methane-enriched gas which is produced in the context of the present application is also a biomethane and can also be considered to be the methane-enriched biogas when a crude biogas is used as the carbon dioxide-containing gas. The term "biomethane" should be understood to be distinguished from synthetic methane which is formed in chemically catalysed methanation.

Bionatural gas and SNG (substitute natural gas): "Bionatural gas" should be understood to mean a methane gas which can be fed into the natural gas distribution system in accordance with the current guidelines (in Germany, for example, DVGW Guidelines G260, G262) and which has been produced in a biological methanation using $CO_2$ of a biogenic origin. The term "SNG", the abbreviation for "synthetic natural gas", is almost synonymous with this, i.e. a technically produced substitute for natural gas which can be used in the same manner and which can be fed into the natural gas distribution system as an exchange gas.

Biomass: The term "biomass" as used in the context of the invention should be understood to mean all types of fermentable sustainable crude materials such as corn, grain, grass, silphium, sugarbeets, but also animal excrement such as cattle or pig manure, horse manure or dry chicken manure, as well as municipal or industrial waste water along with biological waste or organic waste from food production or processing, as well as any mixtures of these fermentation substrates.

Fermentation residue: The term "fermentation residue" or "digestate" describes the residue of fermentation substrate which is left behind following fermentation of biomass in a plant for the production of biogas. The term "fermentation residue" should be understood to mean, for example, the residue after the final temperature-controlled fermentation stage (for example secondary fermenter) in a biogas plant. Similarly, the term "fermentation residue" should be understood to include digested sludge from sewage treatment plant digestion towers.

Bioreactor=methanation reactor: A reactor with a methanation medium including methanogenic microorganisms in which the product gas methane is formed from carbon dioxide and hydrogen.

Methanation: The term "methanation" should be understood to mean methane formation starting from the gaseous substances hydrogen and carbon dioxide as educt gases. "Biological methanation" describes the formation of biomethane with the aid of hydrogenotrophic methanogenic microorganisms in an aqueous medium. It essentially occurs in accordance with the chemical equation: $4H_2 + CO_2 \rightarrow CH_4 + 2 H_2O$. If carbon monoxide is contained in one of the educt gases, the methane can additionally be formed in accordance with the equation: $3H_2 + CO \rightarrow CH_4 + H_2O$. Other ways of forming methane, for example from acetate or methyl compounds, are not excluded, depending on the methanation medium employed and the reaction conditions used, but they play a subordinate role because carbon dioxide-containing gas and hydrogen-containing gas is added in overwhelming quantities.

Methanation medium: This describes the content of the bioreactor which is suitable for carrying out a biological methanation. The methanation medium is an aqueous reaction medium and constitutes the nutrient medium for the methanogenic microorganisms. It contains all of the nutrients and trace elements and other components which are necessary for the growth of the corresponding hydrogenotrophic methanogenic microorganisms. Either a synthetic culture medium for methanogenic microorganisms is used, or a complex nutrient medium based on biomass is used which essentially consists of a fermentation residue as the substrate, possibly supplemented with nutrients and/or trace elements.

BRIEF DESCRIPTION OF THE DRAWINGS

The invention will now be described in more detail in connection with the drawings with the aid of exemplary embodiments. Obviously, the statements made with respect to the exemplary embodiments do not limit the invention. In the figures.

WAYS OF CARRYING OUT THE INVENTION

Figure 1:
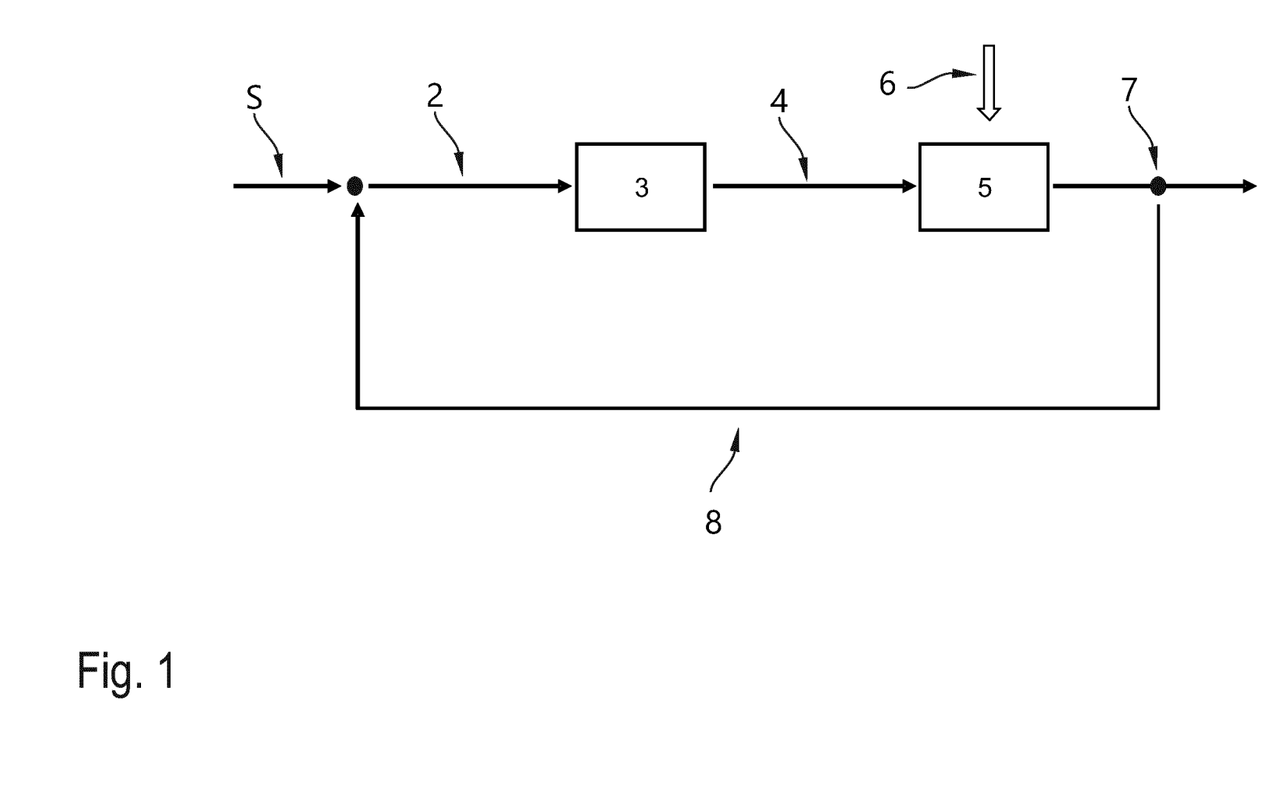
FIG. 1 shows the process in accordance with the invention in the form of a block diagram.

Exemplary Embodiment 1 can be explained in more detail in association with FIG. 1. FIG. 1 shows the process in accordance with the invention in the form of a block diagram.

Firstly, a target value S is specified for the proportion of carbon dioxide in the methane-enriched gas removed from the bioreactor. The regulation of the quantity of carbon dioxide-containing gas supplied and/or the regulation of the quantity of hydrogen-containing gas supplied is carried out in accordance with the invention in a manner such that the measured actual value 7 of the proportion of $CO_2$ in the product gas is as close as possible to the specified target value S or corresponds thereto.

The regulation of the quantity of the carbon dioxide-containing gas supplied and/or the regulation of the quantity of hydrogen-containing gas supplied is carried out exclusively on the basis of the comparison of the specified target value S with the measured actual value 7 of the proportion of carbon dioxide in the methane-enriched gas removed from the bioreactor. The control deviation 2 is calculated by producing the difference of the target value S minus the actual value 7.

An appropriately programmed control module which is usually installed on a processor unit functions as the controller 3, which generates feedback 8 of the measured actual value 7 to the starting point of the control loop and then carries out a comparison of the specified target value S with the measured actual value 7. The aim of this mode of operation of the controller is to reduce the control deviation 2 to zero. The regulation of the quantity of supplied carbon dioxide-containing gas and/or the regulation of the quantity of supplied hydrogen-containing gas is carried out in a manner such that the control module calculates an amended ratio of the educt gases $H_2$ (or hydrogen-containing gas) and $CO_2$ (or $CO_2$ containing gas). This acts as the control variable 4. The ratio of the educt gases is adjusted by means of the metering of the educt gases as a reaction to the actual value 7, i.e. the $CO_2$ content in the product gas.

The methanation reactor itself constitutes the control system 5 of the system. Any parameters which vary the composition of the product gas from the methanation can act as disturbances 6 acting on the control system 5, for example variations in the pH or the temperature in the bioreactor, but also variations in the composition of the reactor medium due to growth and metabolization of the microorganisms.

Figure 2:
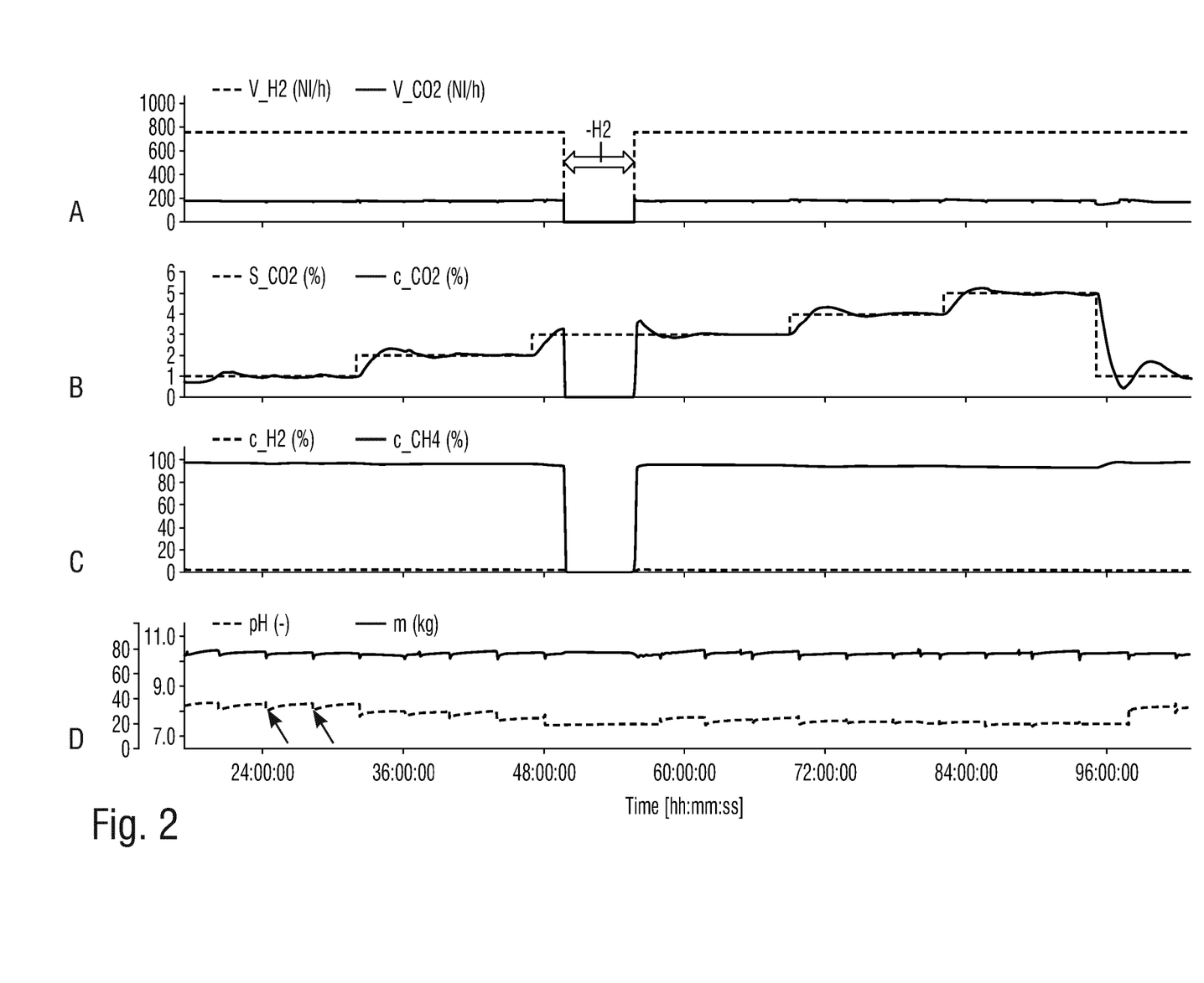
FIG. 2 shows, in the form of a graphical representation, measured values for the product gas composition and procedural parameters when implementing an embodiment of the process in accordance with the present invention.

FIG. 2 shows, as a graphical representation, measured values for the product gas composition as well as further procedural parameters when implementing an embodiment of the process for biological methanation in accordance with the present invention. The test results demonstrate that when using a process in accordance with the present invention with target values for the $CO_2$ content in the product gas in the range from 1 vol % to 5 vol % inclusive, a bioreactor can be operated in a stable manner, without carrying out a pH adjustment by measuring the pH in the reactor and appropriate addition of base or acid. In addition, the data show that without further gas treatment, a methane-enriched gas is obtained as the product gas which has a very high methane content of at least 93 vol % with a hydrogen concentration of less than 2.5 vol %.

The biological methanation was carried out in a bioreactor which contained digested sludge from a municipal sewage treatment plant as the methanation medium, to which individual trace elements and nutrients had been added. The biological methanation was carried out with the addition of a methanogenic microorganism from the genus Methanothermobacter. The production of the methane-enriched gas was carried out in a continuous stirred tank reactor with a 75 litre reactor content, at a temperature of 65° C. and a pressure of 7 bar. Over the entire time period, a methane-enriched gas with a methane formation rate (MFR) of 60 standard cubic metres of methane per cubic metre of reactor contents per day [$Nm^3/m^3d$)] was produced. Over the time period shown in FIG. 2, $CO_2$ regulations with target values of 1 vol %, 2 vol %, 3 vol %, 4 vol % and 5 vol % of carbon dioxide in the product gas in an increasing order were carried out. The information on the time axis corresponds to the time in hours.

Graph A of FIG. 2 shows the supply of the educt gases $H_2$ and $CO_2$. This was carried out from gas bundles each with pure $H_2$ and $CO_2$ in pressurized gas cylinders. The respective gas volume flow in standard litres per hour [Nl/h] was adjusted using a mass flow regulator from Bronkhorst. The hydrogen volume flow (V_H2; broken line) was kept constant over the entire time period of the test and was pre-set to 750 Nl/h. The value for the supplied carbon dioxide volume flow (V_CO2; black line) was obtained after measuring the actual value and calculating the control deviation from the control variable output by the $CO_2$ controller in connection with the specified hydrogen volume flow. Over the time period of the test shown, the increase in the target values for $CO_2$ from 1 vol % to 5 vol % generated values for the carbon dioxide volume flow in the range from 166 Nl/h to 187 Nl/h. In the time period from 50 hours to 56 hours, because of an interruption to the hydrogen supply, no educt gases could be supplied, and so no methane-enriched gas could be produced.

Graph B of FIG. 2 shows the measured concentration of $CO_2$ in the product gas (c_CO2; black line) in vol %. This corresponds to the actual value of the control variable. The target value specified in the respective time period for the process in accordance with the invention for carbon dioxide in the product gas (S_CO2) in vol % is shown as a broken line.

Graph C of FIG. 2 shows the measured values for the methane concentration in the product gas (c_CH4; black line) in vol %, as well as the hydrogen concentration in the product gas (c_H2; broken line) in vol %. All of the gas components of the product gas were measured with inline gas analysis devices from Emerson.

Graph D of FIG. 2 shows the measured values for the mass of the reactor contents (m; black line) in kilograms [kg] on the scale shown on the left (black values) as well as the measured pH values (pH; broken line) on the right hand scale. The mean reactor content was 75 kilogram. A portion of the reactor contents was removed at regular intervals and subsequently supplemented with fresh substrate or methanation medium so that a certain amount of exchange for fresh material was carried out. This can be seen in graph D of FIG. 4 as small downward deflections and a subsequent increase in the mass. The pH of the methanation medium was not measured with a pH probe directly in the bioreactor, but in the outflow from the reactor, each time directly after removing the reactor content to be exchanged. The relevant pH for the reactor contents corresponded in each case to the lowest measured value in an exchange cycle (the arrows show examples).

Over a time period of approximately 12 hours, respectively, the biological methanation was carried out in accordance with the process of the invention with $CO_2$ regulation with specified target values of 1 vol %, 2 vol %, 3 vol %, 4 vol % and 5 vol % carbon dioxide in the product gas in an increasing series. With each of the target values, a stable methanation with good gas quality in the product gas without the addition of base or acid was possible. A methane formation rate of 60 standard cubic metres of methane per cubic metre of reactor contents per day was obtained. Each time, the predetermined target value for the $CO_2$ concentration in the product gas was not obtained immediately after inputting the value, but only after a certain initial period. This behaviour is also desirable to a certain extent, because very rapid variations to the reaction conditions in biological systems are not generally advantageous because they can endanger the stability of processes.

In addition, a certain transient response with values over and under the predetermined target value was observed. However, this is typical control behaviour and depends to a certain extent on the regulation parameters which are set. In all cases, however, after a few hours, the specified target value reached a stable level and held. The hydrogen concentrations in the product gas were less than 2.5 vol % throughout. Up to a set concentration of 3 vol % $CO_2$, the $CH_4$ concentration was more than or equal to 95 vol %. With specified set concentrations of $CO_2$ of 4 vol % or 5 vol %, the $CH_4$ concentration was 93 vol % or more, because here, due to the specification by the controller, a correspondingly high $CO_2$ content was present in the product gas. Even after interrupting the methanation because of an interruption of the hydrogen supply in the time period from hour 50 to hour 56, the methanation could be continued without delay with the same level of methane formation and equally good product gas quality. The pH, which was determined at regular intervals each time directly in the reactor contents discharged from the reactor, was in the range from approximately 8.1 to 7.5 over the entire time period of the test.

After regulating the $CO_2$ target value to 5 vol %, the adjustment was dropped in one step to a target value of 1 vol % $CO_2$. The transient responses had a larger amplitude than in the variations in steps of only 1 vol %, and the regulation by means of the control variable also led to the volume flow for the educt gas $CO_2$ being briefly reduced to a value of 147 Nl/h, but here too, after a few hours the specified target value of 1 vol % $CO_2$ was obtained. No problems arose in returning the bioreactor including its contents to the starting condition with a low $CO_2$ content. In the product gas, with a target value for $CO_2$ specified at 1 vol %, a methane concentration of 97 vol % and a residual hydrogen concentration of 2 vol % were obtained. As a rule, this meets the specified limits for a biomethane which can be fed into the grid.

Figure 3:
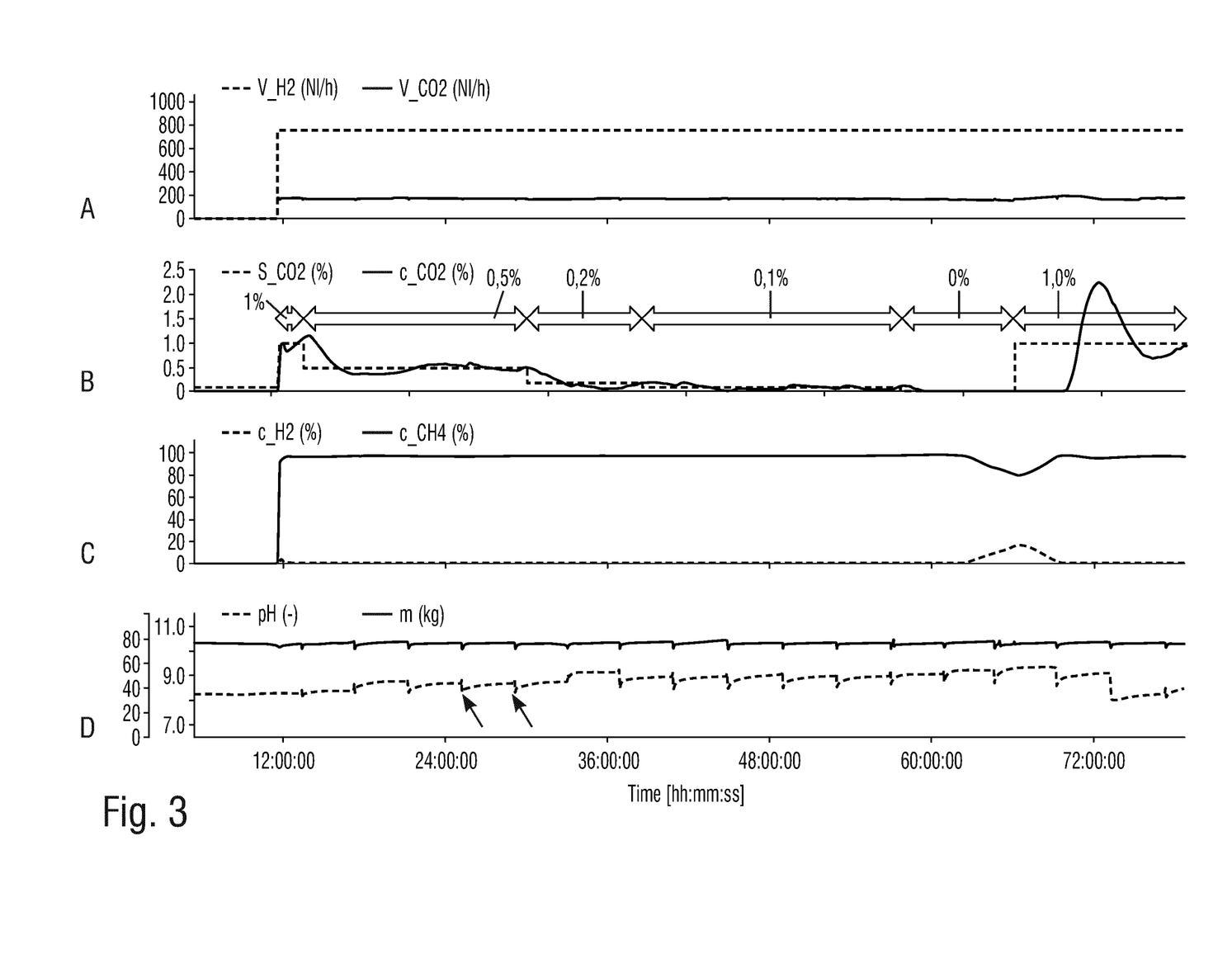
FIG. 3 shows, in the form of a graphical representation, measured values for the product gas composition and procedural parameters when implementing a further embodiment of the process in accordance with the present invention.

FIG. 3 shows, in the form of a graph, measured values for the product gas composition as well as further procedural parameters when implementing an embodiment of the process for biological methanation in accordance with the present invention. The test results show that when applying a process in accordance with the present invention with target values for the $CO_2$ content in the product gas in the range from 1 vol % to 0.1 vol %, a bioreactor can be operated in a stable manner without carrying out a pH adjustment by measurement of the pH in the reactor and the appropriate addition of base or acid. In addition, the data show that without further gas treatment, a methane-enriched gas can be obtained as a product gas which has a very high methane content of at least 97 vol %, with a hydrogen concentration of less than 2 vol %.

The exemplary embodiment shown in FIG. 3 is a continuation of the biological methanation described in FIG. 2. The test conditions as well as the representations of graphs A to D correspond to those of exemplary embodiment 2, with the exception that in the present case, $CO_2$ target values of 1 vol % down to 0 vol % in steps of 1 vol %, 0.5 vol %, 0.2 vol %, 0.1 vol % and 0 vol % were specified.

This example was begun with a target value of 1 vol % $CO_2$, measured in the product gas. This specified target value corresponded to the start value and the end value for Exemplary Embodiment 2. Down to a target value of 0.1 vol % $CO_2$, biological methanation was possible. The values for the volume flow of carbon dioxide for the educt gas were in the range from 178 Nl/h down to 167 Nl/h, while the hydrogen volume flow was held constant at 750 Nl/h. The methane concentrations in the product gas were in the range between 97 vol % to 98.5 vol % with a hydrogen concentration of about 1.5 vol % to 1.75 vol %. The measured pH values in the outflow of methanation medium from the reactor were between pH 8.1 and pH 8.8. The regulation to a target value S of 0.1 vol % $CO_2$ in the product gas was maintained for a time period of 20 hours.

Next, regulation was carried out such that no more $CO_2$ could be measured in the product gas, by setting the target value for $CO_2$ to zero. This specification for the $CO_2$ regulation was maintained over a time period of 8 hours. As can be seen in graph A of FIG. 3, the volume flow for the educt gas carbon dioxide was reduced from 171 Nl/h to a concentration of 157 Nl/h. The pH rose to a value of almost 9.

Approximately two and a half hours after specifying the target value of 0 vol % $CO_2$ in the product gas, $CO_2$ could no longer be measured in the product gas. After another 2 hours, the product gas quality deteriorated substantially. In the next 4 hours, the methane content dropped from a value of 98 vol % to a value of 81 vol %. At the same time, the proportion of hydrogen in the product gas rose from approximately 1.5 vol % to almost 17 vol %.

In addition, the hydrogen sulphide concentration in the product gas after 63 hours was observed to climb from a value of 50 ppm to a value of more than 120 ppm, along with an increase in the hydrogen concentration and a drop in the methane concentration. Similarly, an increase in the ammonia concentration was observed in the product gas. The same observations were repeated two more times when, during a period of the test, target values for the concentration of carbon dioxide in the product gas were set to zero. In this manner, it was shown that regulation in the sense that the carbon dioxide is completely consumed does not work with biological methanation, while a regulation to a target value for the $CO_2$ in the product gas in the range from 0.1 vol % to 5 vol % using the process in accordance with the invention did work, and a good to very good quality methane-enriched gas was provided.

A further advantage of the process in accordance with the invention was found, in that surprisingly, a pH adjustment by adding acid or base with simultaneous continuous pH measurement in the bioreactor could be dispensed with.

In order to prevent a total "crash" of the biological methanation in the bioreactor, after 66 test hours, the target value for the $CO_2$ in the product gas was raised again from 0 vol % to 1 vol %. While the carbon dioxide flow in the educt gas rose directly after the adjustment, the gas quality also rapidly improved again. It took a few hours for the pH to drop and for the $CO_2$ content in the product gas to settle at 1 vol %, however the biological methanation could subsequently be carried out again and the bioreactor including its contents could be returned to an operable state.

FIGS. 4A, 4B, 4C and 4D show a further exemplary embodiment for the implementation of the process for biological methanation in accordance with the present invention. The graphical representation of the measured values for the product gas composition as well as further procedural parameters are produced in an analogous manner to that described in connection with FIGS. 2 and 3, with the sole difference being that in the lowest section of the figure, the methane formation rate (MFR) is provided instead of the pH. The regularly repeating upward and downward deflections in the target methane formation rate occur because in each case, when substrate was exchanged in the bioreactor, variations in the quantity of the reactor contents occurred over a specific period, as well as pressure variations, which resulted in temporary variations in the volume flow of the product gas, which lead to variations in the MFR. The pH was not measured in the reactor, but samples were repeatedly taken in order to measure the pH.

Figure 4A:
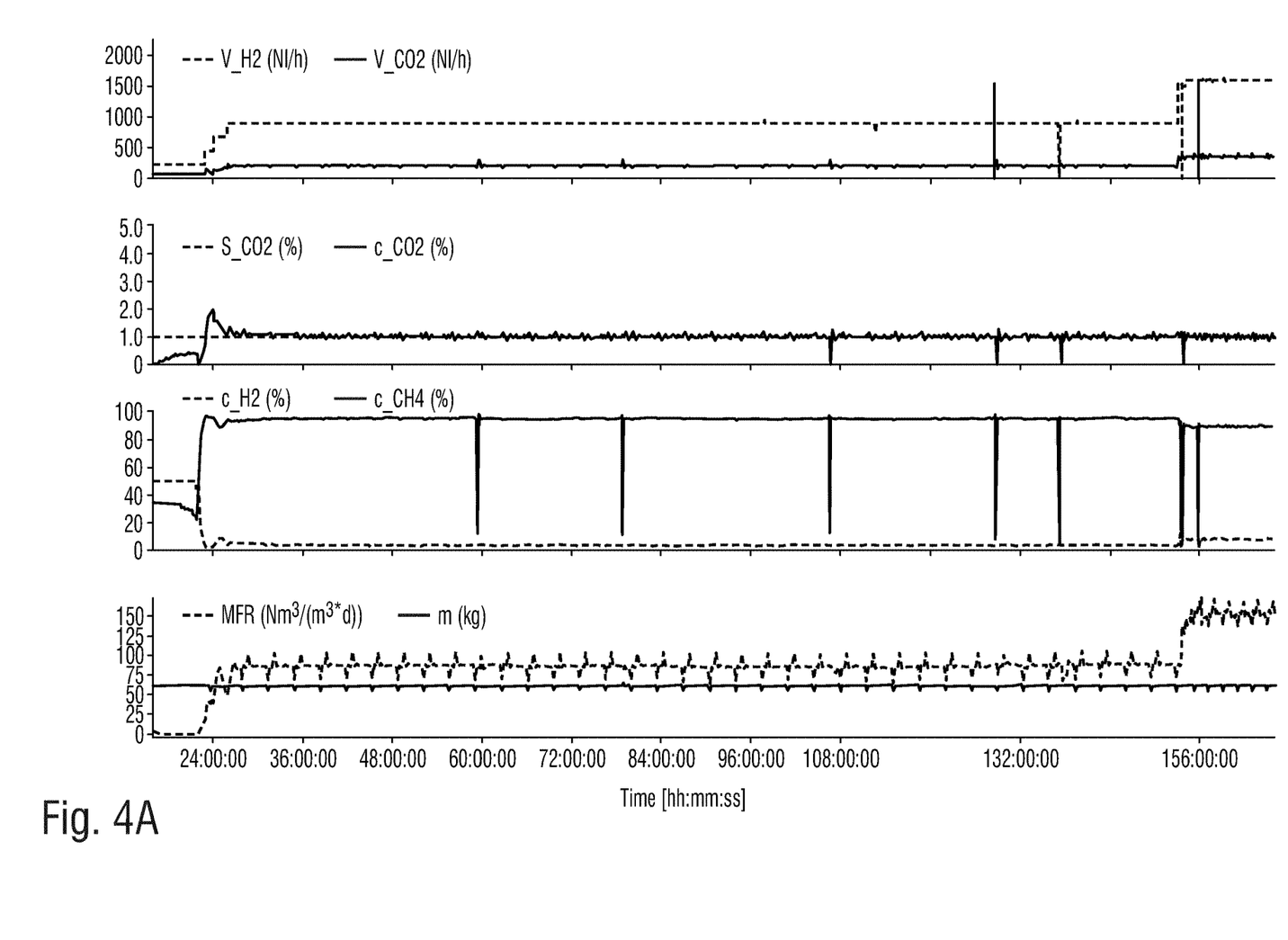
FIGS. 4A, 4B, 4C show, in the form of a graphical representation, measured values for the product gas composition and procedural parameters when implementing a further embodiment of the process in accordance with the present invention.
Figure 4B:
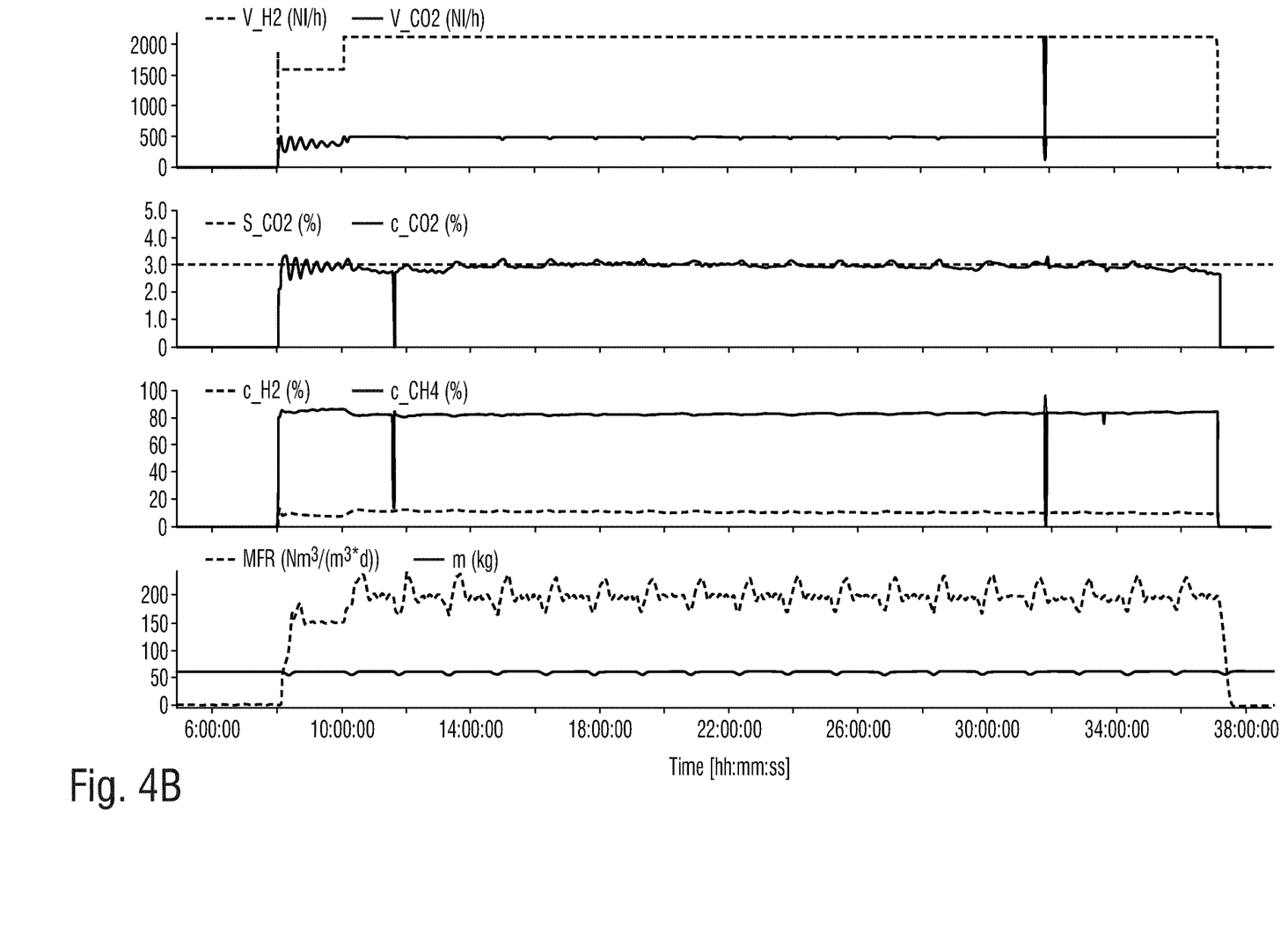
Figure 4C:
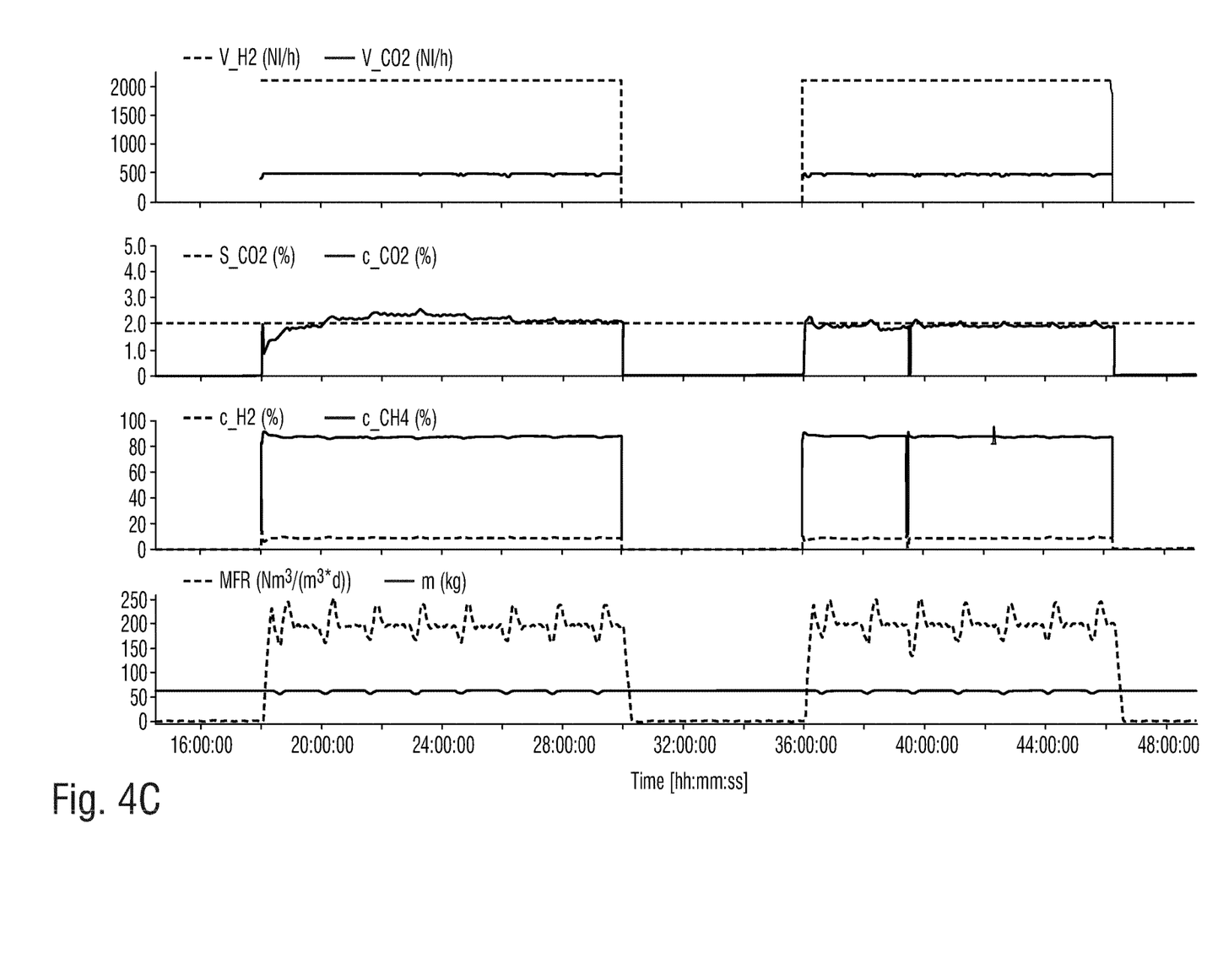

The biological methanation was carried out in a bioreactor which contained digested sludge from a municipal sewage treatment plant. However, in this example, no trace elements and nutrients were added; only a reducing agent was added to the methanation medium. The biological methanation was carried out without the addition of a methanogenic microorganism. The production of the methane-enriched gas was carried out in a continuous stirred tank reactor with a 60 litre reactor content at a temperature of 65° C. and a pressure of 7 bar.

In the time period shown in FIG. 4A, the target value for the $CO_2$ concentration in the product gas was set at 1 vol % for the regulation. At the start of methanation, the gas volume flow for the educt gas hydrogen was raised in steps so that after 3 hours, methane-enriched gas could already be produced at a methane formation rate of 85 $Nm^3/(m^3d)$. At that point in time, the proportion of $CO_2$ in the product gas had already settled at the target value of 1 vol %. Over the entire time period of 30 hours of test time up to 150 hours, the methanation was stable at the same methane formation rate. A methane-enriched gas was produced with a methane fraction of approximately 94 vol % to 95 vol %, a hydrogen fraction of approximately 3.5 vol % and a carbon dioxide fraction of 1 vol %. The interfering signals which can be seen in the gas analysis values as irregular repeating vertical lines result from sampling. Beyond the 152 hour test point, the educt gas supply was increased so that after a further 2 to 3 hours, a methane formation rate of 153 $Nm^3/(m^3d)$ was obtained. The target value for the $CO_2$ adjustment was unchanged in this case. With the methane formation rate of 153 $Nm^3/(m^3d)$, a gas quality of approximately 89 vol % methane and about 8 vol % hydrogen was obtained.

After pausing the educt gas supply, the methanation was continued at the same methane formation rate, but with a $CO_2$ target value of 3 vol % being specified. This is shown in FIG. 4B. The volume flows for $H_2$ and $CO_2$ were specified so that from the outset, a methane formation rate of 153 $Nm^3/(m^3d)$ was obtained. The oscillations in the $CO_2$ values in the product gas at 3 vol % lasted about 4 hours.

The methane-enriched gas contained about 87 vol % of methane and about 8 vol % of hydrogen as well as 3 vol % of carbon dioxide. Immediately thereafter, the methane formation rate was raised to a value of 200 $Nm^3/(m^3d)$, keeping the $CO_2$ target value the same. This was possible without problems. The gas quality deteriorated somewhat at the high methane formation rate to values of about 84 vol % methane and about 11 vol % hydrogen.

After a lengthy methanation pause, the methanation was continued with a methane formation rate of 200 $Nm^3/(m^3d)$, wherein the $CO_2$ target value was set at a value of 2%. This can be seen in FIG. 4C. At the start of methanation, at 18 test hours, it took 8 hours for the stable $CO_2$ value of 2 vol % to be established. The gas quality for the product gas improved to approximately 87.5 vol % methane and 8.5 vol % hydrogen. After an interruption of 6 hours to the educt gas supply, a very rapid restart was carried out under the same conditions, wherein the $CO_2$ target value of 2 vol % was also obtained from the outset.

The Exemplary Embodiment described in FIGS. 4A to 4D shows that in a further methanation medium, even at high methane formation rates of up to 200 $Nm^3/(m^3d)$, biological methanation in accordance with the process of the present invention was possible at different specified target values for the carbon dioxide in the product gas, even when the methane-enriched gas still did not reach an infeed quality directly after leaving the bioreactor. By means of a subsequent gas treatment with separation of the residual hydrogen, methane-enriched gas produced in this manner can be converted into a bionatural gas or SNG. In this example as well, there was no pH adjustment by the addition of acid or base. The pH measured in the samples from the bioreactor was at values between a pH of 7.6 and 8.4 throughout the test period, which was well suited to methane formation. In addition, the measured values for the hydrogen sulphide content or ammonia content in the product gas were insignificant.

Figure 5:
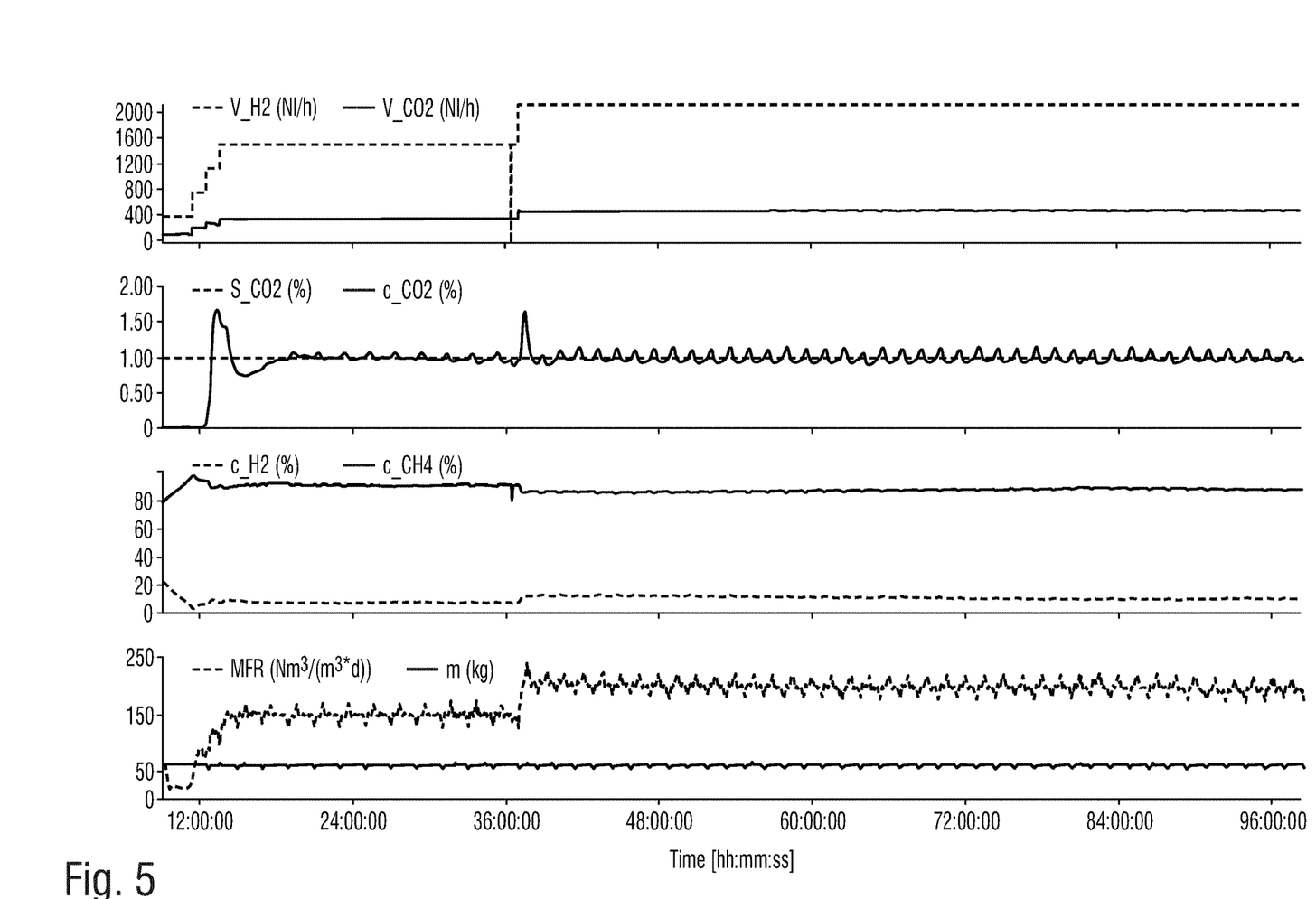
FIG. 5 shows, in the form of a graphical representation, measured values for the product gas composition and procedural parameters when implementing a further embodiment of the process in accordance with the present invention.

FIG. 5 shows a further exemplary embodiment for carrying out the process for biological methanation in accordance with the present invention. The graphical representation of the measured values for the product gas composition as well as further procedural parameters are analogous to those shown in connection with FIGS. 4A to 4D.

The biological methanation was carried out in a bioreactor which contained a synthetic culture medium as the methanation medium, as used in the prior art for hydrogenotrophic methanogenic archaea (see, for example, WO 2008/094282 A1 or WO 2012/110257 A1). The medium was inoculated with a methanogenic strain from the order Methanobacteriales. The production of the methane-enriched gas was carried out in a continuous stirred tank reactor with a 60 litre reactor content at a temperature of 65° C. and under a pressure of 7 bar.

In the time period shown in FIG. 5, the target value for the $CO_2$ concentration in the product gas was set at 1 vol % for the regulation. At time point zero, the biological methanation was started up. In this regard, the gas volume flow for the educt gas hydrogen was raised in steps so that after 4 hours, methane-enriched gas could already be produced at a methane formation rate of 150 Nm³/(m³d). After a further 5 hours, the $CO_2$ fraction in the product gas had settled at the target value of 1 vol %. Up to a 37 hours of test, a methane-enriched gas with a methane content of 90 vol % to 92 vol % was produced, with a hydrogen content of 7 vol % to 8.5 vol %. Beyond the 37 hour test point, the educt gas supply was increased so that a short time later, a methane formation rate of 200 Nm³/(m³d) was obtained. The target value for the $CO_2$ regulation was unchanged.

The methanation was very stable over the entire remaining test period, wherein the gas quality over the test period improved slightly. A methane-enriched gas was produced in which the methane fraction of approximately 85 vol % increased slightly to 89 vol %, while the hydrogen fraction dropped from approximately 13.5 vol % to approximately 10 vol % and the carbon dioxide fraction oscillated around the target value of 1 vol %. The targeted gas qualities in the product gas in this exemplary embodiment with a system in which a synthetic culture medium was used with defined methanogens as the reactor content agreed very well with the values obtained in Exemplary Embodiment 4, in which digested sludge was used as the substrate, with comparable methane formation rates, and no defined methanogenic microorganism was added.

After the start of methanation, the pH in the synthetic culture medium first had to stabilize somewhat, but from approximately 30 hours, a small quantity of caustic soda was also added at regular intervals in order to keep the pH to a value of between 6.6 and 7.2, during which the biological methanation functioned smoothly, although only after the $CO_2$ fraction in the product gas had been regulated as described in the present invention.

LIST OF REFERENCE SIGNS

S target value (reference variable)
2 control deviation (target value-actual value)
3 controller
4 control variable
5 control system
6 disturbance
7 actual value (control variable)
8 feedback

The invention claimed is:

1. A process for the production of a methane-enriched gas, comprising the steps of:
  a) providing a bioreactor having:
    at least one device for supplying a gas,
    at least one outlet for removing the methane-enriched gas generated in the bioreactor,
  b) providing a device for determining the proportion of carbon dioxide in the methane-enriched gas removed from the bioreactor,
  c) specifying a target value S for the proportion of carbon dioxide in the methane-enriched gas removed from the bioreactor,
  d) supplying carbon dioxide-containing gas to the bioreactor,
  e) supplying hydrogen-containing gas to the bioreactor,
  f) forming methane-enriched gas in the bioreactor,
  g) removing the methane-enriched gas formed in the bioreactor from the bioreactor,
  h) determining an actual value for the proportion of carbon dioxide in the methane-enriched gas removed from the bioreactor,
  i) comparing the target value S specified in step c) with the actual value determined in step h),
  j) regulating the quantity of carbon dioxide-containing gas supplied in step d) and/or regulating the quantity of hydrogen-containing gas supplied in step e) in a manner such that the actual value determined in step h) corresponds to the target value S specified in step c),
  wherein the target value S specified in step c) for the proportion of carbon dioxide in the methane-enriched gas removed from the bioreactor satisfies the condition 0 vol %<S≤5 vol %.

2. The process according to claim 1, wherein the target value S specified in step c) for the proportion of carbon dioxide in the methane-enriched gas removed from the bioreactor satisfies the condition 0 vol %<S≤4 vol %.

3. The process according to claim 1, wherein the target value S specified in step c) for the proportion of carbon dioxide in the methane-enriched gas removed from the bioreactor satisfies the condition 0 vol %<S≤2 vol %.

4. The process according to claim 1, wherein the target value S specified in step c) for the proportion of carbon dioxide in the methane-enriched gas removed from the bioreactor satisfies the condition 0 vol %<S≤1.5 vol %.

5. The process according to claim 1, wherein the target value S specified in step c) for the proportion of carbon dioxide in the methane-enriched gas removed from the bioreactor satisfies the condition 0.1 vol %≤S≤5 vol %.

6. The process according to claim 1, wherein the target value S specified in step c) for the proportion of carbon dioxide in the methane-enriched gas removed from the bioreactor satisfies the condition 0.1 vol %≤S≤ 4 vol %.

7. The process according to claim 1, wherein the target value S specified in step c) for the proportion of carbon dioxide in the methane-enriched gas removed from the bioreactor satisfies the condition 0.1 vol %≤S≤2 vol %.

8. The process according to claim 1, wherein the target value S specified in step c) for the proportion of carbon dioxide in the methane-enriched gas removed from the bioreactor satisfies the condition 0.1 vol %≤S≤1.5 vol %.

9. The process according to claim 1, characterized in that the target value S specified in step c) for the proportion of carbon dioxide in the methane-enriched gas removed from the bioreactor satisfies the condition 0.5 vol %≤S≤5 vol %.

10. The process according to claim 1, wherein the target value S specified in step c) for the proportion of carbon dioxide in the methane-enriched gas removed from the bioreactor satisfies the condition 0.5 vol %≤S≤4 vol %.

11. The process according to claim 1, wherein the target value S specified in step c) for the proportion of carbon dioxide in the methane-enriched gas removed from the bioreactor satisfies the condition 0.5 vol %≤S≤2 vol %.

12. The process according to claim 1, wherein the target value S specified in step c) for the proportion of carbon dioxide in the methane-enriched gas removed from the bioreactor satisfies the condition 0.5 vol %≤S≤1.5 vol %.

13. The process according to claim 1, wherein at least two devices are provided for supplying gases are provided, wherein at least one device for supplying a carbon dioxide-containing gas and at least one device for supplying a hydrogen-containing gas are provided.

14. The process according to claim 1, wherein the device for supplying a carbon dioxide-containing gas and/or the device for supplying a hydrogen-containing gas is a device for regulating flow.

15. The process according to claim 1, wherein the regulation in step j) is carried out exclusively on the basis of the comparison carried out in step i).

16. The process according to claim 1, wherein the comparison in step i) and the regulation in step j) are carried out by means of a processor unit.

\* \* \* \* \*